US009589242B2

(12) United States Patent
Robinson et al.

(10) Patent No.: US 9,589,242 B2
(45) Date of Patent: Mar. 7, 2017

(54) INTEGRATING CUSTOM POLICY RULES WITH POLICY VALIDATION PROCESS

(75) Inventors: Neil Robinson, Bellevue, WA (US); Annette Bruer, Fargo, ND (US); Clifford Hoglund, Deerfield, NH (US); Jarek Wyganowski, Fargo, ND (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 359 days.

(21) Appl. No.: 13/235,573

(22) Filed: Sep. 19, 2011

(65) Prior Publication Data

US 2013/0073531 A1  Mar. 21, 2013

(51) Int. Cl.
  *G06F 17/30* (2006.01)
  *G06Q 10/06* (2012.01)

(52) U.S. Cl.
  CPC ................................. *G06Q 10/06* (2013.01)

(58) Field of Classification Search
  CPC ....................................... G06Q 10/06
  USPC ...................................... 707/608
  See application file for complete search history.

(56) References Cited

U.S. PATENT DOCUMENTS

| 6,473,748 | B1 | 10/2002 | Archer |
| 7,428,495 | B2 | 9/2008 | Dhar et al. |
| 7,496,191 | B1 * | 2/2009 | Crews et al. ............ 379/220.01 |
| 7,596,566 | B1 * | 9/2009 | Patwardhan .................. 705/321 |
| 7,676,387 | B2 | 3/2010 | Childress et al. |
| 7,761,396 | B2 | 7/2010 | Weigt et al. |
| 8,170,902 | B2 * | 5/2012 | Kennis et al. ................ 705/7.28 |
| 2002/0099952 | A1 * | 7/2002 | Lambert ............... G06F 21/126 726/27 |
| 2002/0143735 | A1 * | 10/2002 | Ayi ..................... G06F 17/30289 |
| 2002/0194127 | A1 * | 12/2002 | Randell ................... G06Q 20/04 705/40 |
| 2004/0220815 | A1 * | 11/2004 | Belanger et al. .................. 705/1 |
| 2005/0033668 | A1 * | 2/2005 | Garcia et al. ................... 705/30 |

(Continued)

OTHER PUBLICATIONS

HP SOA Systinet Software Version: 2.52, Standard Edition Assertion Editor, Nov. 2007, pp. 1-59.*

(Continued)

*Primary Examiner* — Albert Phillips, III
(74) *Attorney, Agent, or Firm* — Thomas R. Marquis; Kate Drakos; Micky Minhas

(57) ABSTRACT

A system is provided for integrating custom policy rules with a policy validation process for validating forms within an organization. The system may enable the organization to create new policy rules and to customize existing policy rules for forms according to various specifications. The custom policy rules may be stored in policy database and the policy validation process may be applied to validate submitted forms against the custom policy rules for identifying policy rule violations. The system may automatically apply the policy validation process upon the submission of a form to the organization for identifying violations before posting the form to the organization's system. The system may generate a policy violation results list, and may provide a display message for indicating when policy violations have been identified in the submitted form, and may also present options to the user for addressing the policy violation and approving the form.

19 Claims, 6 Drawing Sheets

(56) References Cited

U.S. PATENT DOCUMENTS

| | | | | |
|---|---|---|---|---|
| 2005/0246274 | A1* | 11/2005 | Abbott | G06Q 20/102 705/40 |
| 2006/0213975 | A1* | 9/2006 | Krishnan | G06Q 20/02 235/380 |
| 2007/0101259 | A1* | 5/2007 | Grigoriadis et al. | 715/517 |
| 2007/0192678 | A1* | 8/2007 | Tang et al. | 715/505 |
| 2008/0133388 | A1 | 6/2008 | Alekseev et al. | |
| 2009/0248467 | A1* | 10/2009 | Bulman | G06Q 20/102 705/26.8 |
| 2009/0281977 | A1* | 11/2009 | Allen et al. | 706/47 |
| 2009/0319402 | A1* | 12/2009 | Manista | G06Q 20/14 705/30 |
| 2010/0031232 | A1* | 2/2010 | Glazier | G06F 8/10 717/106 |
| 2010/0218134 | A1* | 8/2010 | B'Far et al. | 715/780 |
| 2011/0153372 | A1* | 6/2011 | Weinstock | G06Q 10/02 705/4 |
| 2012/0016802 | A1* | 1/2012 | Zeng et al. | 705/317 |

OTHER PUBLICATIONS

HP SOA Systinet Software Version: 2.52, Standard Edition Concepts Guide, Nov. 2007, pp. 1-43.*

HP SOA Systinet Software Version: 2.52, Standard Edition Report Editor, Nov. 2007, pp. 1-36.*

HP SOA Systinet Software Version: 2.52, Standard Edition Reference Administration Guide, Nov. 2007, pp. 1-129.*

HP SOA Systinet Software Version: 2.52, Standard Edition Reference Guide, Nov. 2007, pp. 1-129.*

HP SOA Systinet Software Version: 2.52, Standard Edition User Guide, Nov. 2007, pp. 1-227.*

Kulkarni, Unable to revalidate Invoice in oracle payables, Jun. 4, 2006, pp. 1-2.*

Handle policy rule violations [AX 2012], Mar. 28, 2011, pp. 1-2.*

Scheidel, Designing an IAM Framework with Oracle Identity and Access Management Suite, Jul. 26, 2010, 16 pages.*

"Oracle Workflow Implementation in Other Oracle Products", Retrieved at <<http://download.oracle.com/docs/cd/B19306_01/workflow.102/b15853/T361836T362429.htm>>, Oracle Workflow Developer's Guide, Retrieved Date: Jul. 12, 2011, pp. 51.

Bustamante, Michele Leroux, "WF Scenarios Guidance: SharePoint and Workflow", Retrieved at <<http://msdn.microsoft.com/en-us/library/cc748597.aspx>>, May 2008, pp. 35.

"Account Payable Invoice Processing", Retrieved at <<http://www.banctec.com/business-process-outsourcing/ap-invoice-processing/>>, Retrieved Date: Jul. 12, 2011, pp. 6.

"Using workflow technology to automate invoice processing at GAC World Logistics", Retrieved at <<http://www.busmanagementme.com/article/Using-workflow-technology-to-automate-invoice-processing-at-GAC-World-Logistics>>, Retrieved Date: Jul. 13, 2011, pp. 4.

* cited by examiner

INTEGRATING CUSTOM POLICY RULES WITH POLICY VALIDATION PROCESS

BACKGROUND

In a business environment, many types of business forms may be utilized for submitting information to a business entity or organization. Typically the business forms submitted to an organization may need to be reviewed and evaluated in order to ensure that the business forms meet the organization's standard business practices, and follow certain organization rules and policies. Business forms which may need to be evaluated may include for example, vendor invoices, purchase orders, purchase requests and other similar document types.

Reviewing submitted business forms for ensuring the forms meet the organization's standards and policies can be a complicated and time consuming process. Often times, the review process may require a user within the organization to manually review each line of a submitted business form to identify rule and policy violations. Some programs and applications may be used to automatically review the business forms, however the automated programs and applications may provide a limited set of rules defined by the application developers or may require extensive programming and complicated coding schemes to configure the programs applications to perform the reviews according to custom policy rules.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to generating custom policy rules for an organization and integrating the custom policy rules with a policy validation process for validating forms. The system may enable the organization or a user within the organization to create new policy rules and to customize policy rules for business forms utilizing a user interface provided by a policy administrator within the policy framework of the organization. The policy rules may be customized according to various specifications such as affiliated entity, sub-entity, language, currency, location and date.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
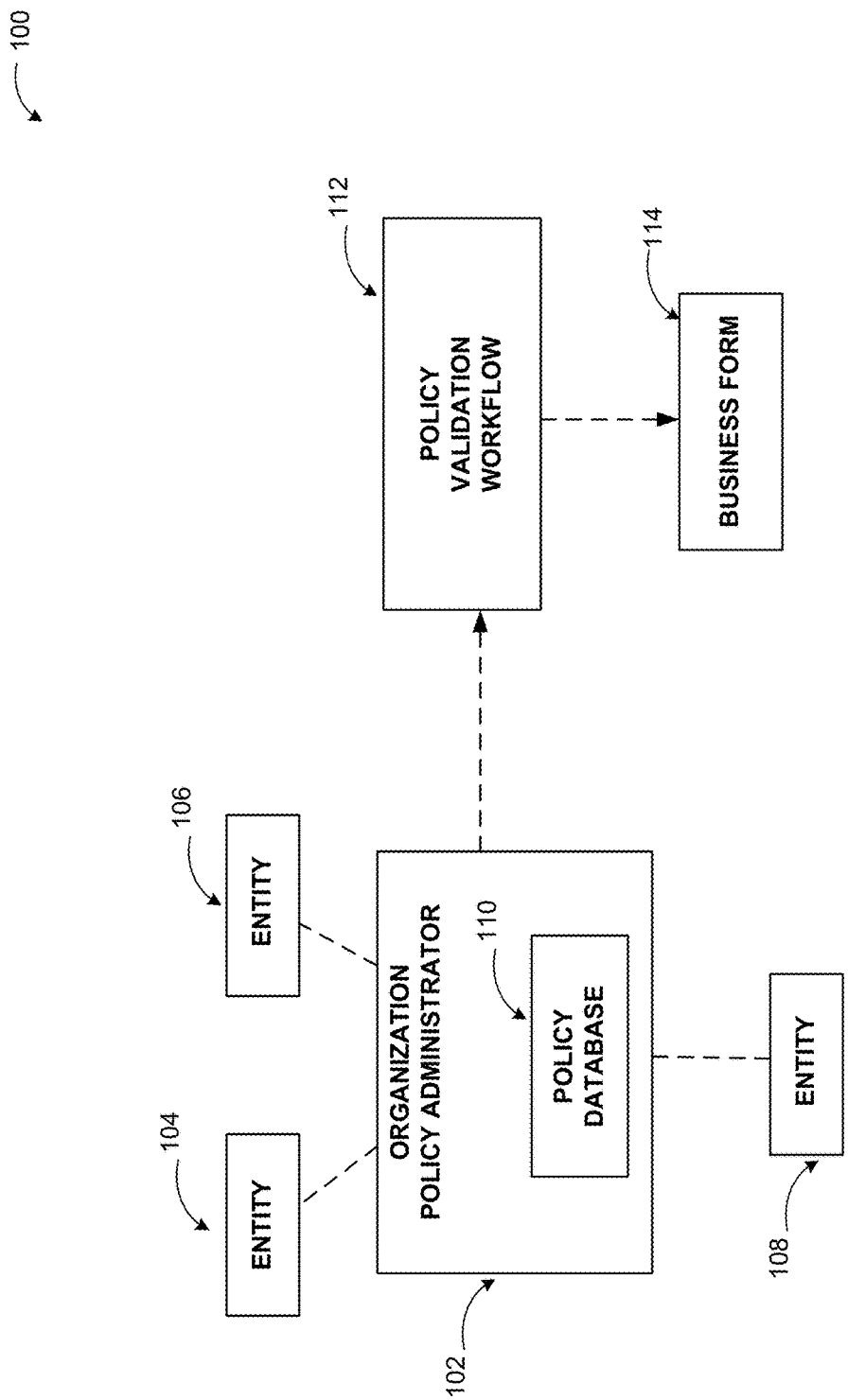
FIG. 1 illustrates example model for an organization employing a policy validation process, according to embodiments.

As briefly described above, a system is provided for integrating custom policy rules with a policy validation process for validating business forms within an organization. The system may enable the organization to create new policy rules and to customize existing policy rules for forms according to various specifications utilizing a user interface which does not require coding or programming. The custom policy rules may be stored in policy database and the policy validation process may be applied to validate submitted forms against the custom policy rules in the policy database for identifying policy rule violations. The system may automatically apply the policy validation process upon the submission of a form to the organization for identifying violations before posting the form to the organization's system, and may additionally enable the policy validation process to be initiated at any time when a form needs to be evaluated for policy violations. The system may generate a policy violation results list which may be stored in the policy database. The system may also provide a message for indicating when policy violations have been identified in the submitted form and may present options to the user for addressing the policy violation and approving the form.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing policy rules and a validation process. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates example model for an organization employing a policy validation process, according to embodiments. An organization, such as a large business entity or enterprise may utilize many types of business forms for running the business and submitting information to the organization. Some example business forms may include vendor invoices, purchase orders, purchase requests, and other similar business type forms. Typically, the business forms may need to be reviewed and evaluated in order to ensure that the business forms meet the organization's standard business practices, and follow certain organization rules and policies. Often times the review process can be complicated and time consuming, such as in a scenario when individual employees may have to manually review each line of a submitted business form for rule and policy violations. In other scenarios, programs and applications may be used to review the business forms, however configuring the applications to perform the reviews may be associated with extensive programming and complicated coding schemes.

A system according to embodiments, as shown in diagram 100, may enable integrating user defined custom policy rules with an evaluation process for reviewing business forms within the organization. The policy rules may define specific rules, standards and customs for the organization which may be evaluated against submitted business forms during an evaluation process to ensure the organization's standards are being met. The system may enable the organization or a user within the organization to define the custom policy rules for business forms, which may be integrated into a policy validation process 112 for evaluation of the business forms, and may allow the organization to control how policy violations are processed within the evaluation process.

The custom policy rules may be stored in policy database such that the policy validation process may validate submitted forms against the custom policy rules stored in the policy database in order to identify policy rule violations. The system may automatically apply the policy validation process upon the submission of a business form to the organization by a user within the organization or by an external entity to the organization. The system may also enable the policy validation process to be applied to a business form at any time when the business form needs to be evaluated for violations. The system may provide a display message for indicating when policy violations have been identified in an evaluated form and may present options to the user for addressing the policy violation and approving the form.

In a system according to embodiments, the organization may utilize a policy administrator 102 for defining and storing the organization's custom policy rules. The policy rules may be organized in a policy database 110 provided by the policy administrator 102. The policy administrator 102 may be part of a policy framework of an enterprise management application utilized by the organization for managing the organization's business programs and projects. In an example embodiment, the organization may include several sub-organizations, divisions, or sub-entities 104, 106, 108 within the organization, each having different specialties or which may be affiliated with different external businesses, companies, areas and countries, for example. Each of the sub-entities may have their own specialized standards, customs, rules and policies for their business practices as well, and may employ the policy validation process 112 to validate the business forms against the policy rules for the sub-entity 104. The system may enable the policy administrator 102 to store the collection of custom policy rules associated with the business forms utilized by the organization in the policy database 110. Additionally, the policy database 110 may store the policy rules associated with the business forms utilized by the one or more sub-entities 104, 106, 108 of the organization.

In an example embodiment, the system may enable the policy rules to be created and customized by the organization. The policy rules may be customized by a user utilizing a user interface within the policy administrator 102 of the organization, without requiring complicated coding or programming schemes. For example, the user interface may enable a user to select an option to view existing policy rules for the organization and to make changes to the existing policy rules using straightforward menu and selection options. Additionally, the user interface may enable a user to select an option create a new policy rule for the organization, and to further customize the policy rule by selecting one of the sub-entities 104, 106, 108 for which the created policy rule may be applicable. The system may enable multiple customization options, including for example, customizing policy rules according to an affiliated client or vendor of the organization, the location of the affiliated client, and the date of the relevant business form.

In a system according to embodiments, the policy administrator 102 may apply the policy validation process (PVP) 112 to a business form 114 within the organization in order to evaluate the business form 114 to ensure that its meet the organization's rules and standards. The PVP 112 may evaluate the submitted business form 114 to validate the business form 114 against appropriate the policy rules stored in the policy database 110 of the policy administrator 102. The PVP 112 may compare the submitted business form 114 against the provided policy rules in order to determine if the business form 114 meets the policy rules and to identify if one or more policy violations occur within the business form 114.

In an example embodiment, a policy violation may occur if any line within the business form 114 does not meet a defined policy rule stored within the policy database 110 applicable to the submitted business form 114. If a policy violation is identified by the PVP 112, then the PVP 112 may display a message indicating that a policy violation has occurred within the business form 114, and the PVP 112 may provide information as to what the policy violation is and where the policy violation occurs. The PVP 112 may return a list of policy violations, and the organization can then review the list of policy violations to fix the identified problems. The resulting list of violations may be stored in the policy database 110 for allowing future comparisons in subsequent reviews of one or more business forms. Additionally, the system may be configured to prevent the posting of the business form 114 if a violation is identified, until the violation has been addressed and fixed, or until a user within the organization has approved the violation The system may be configured to apply the PVP 112 at any time during the organization's business workflow. For example, the system may be configured to automatically apply the PVP 112 upon the submission of the business form 114 to the organization to validate the business form against the policy rules before the business form is posted to the organization's system. The PVP 112 may identify the appropriate policy rules in the policy database 110 to which the submitted business form 114 may be evaluated against, based on criteria such as the sub-entity, client, date, and/or location, for example. The PVP 112 may also be initiated at any time when a user within the organization desires to evaluate a form and selects to apply the PVP 112. When the policy validation process 112 is applied, the user may select to which sub-entity 104 the PVP is being applied, such that the business form 114 may be evaluated against the applicable policy rules.

Further, the system may be configured to apply the PVP 112 upon the submission of a business form to the organization by an external affiliate or vendor via a vendor portal coordinated with the organization's enterprise framework. Upon submission by the external affiliate or vendor, the PVP 112 may be automatically applied before the business form 114 may be posted into the organization's system, ensuring that a business form 114 submitted by an external source meets the organization's policy rules before it can be accepted into the organization's system.

Figure 2:
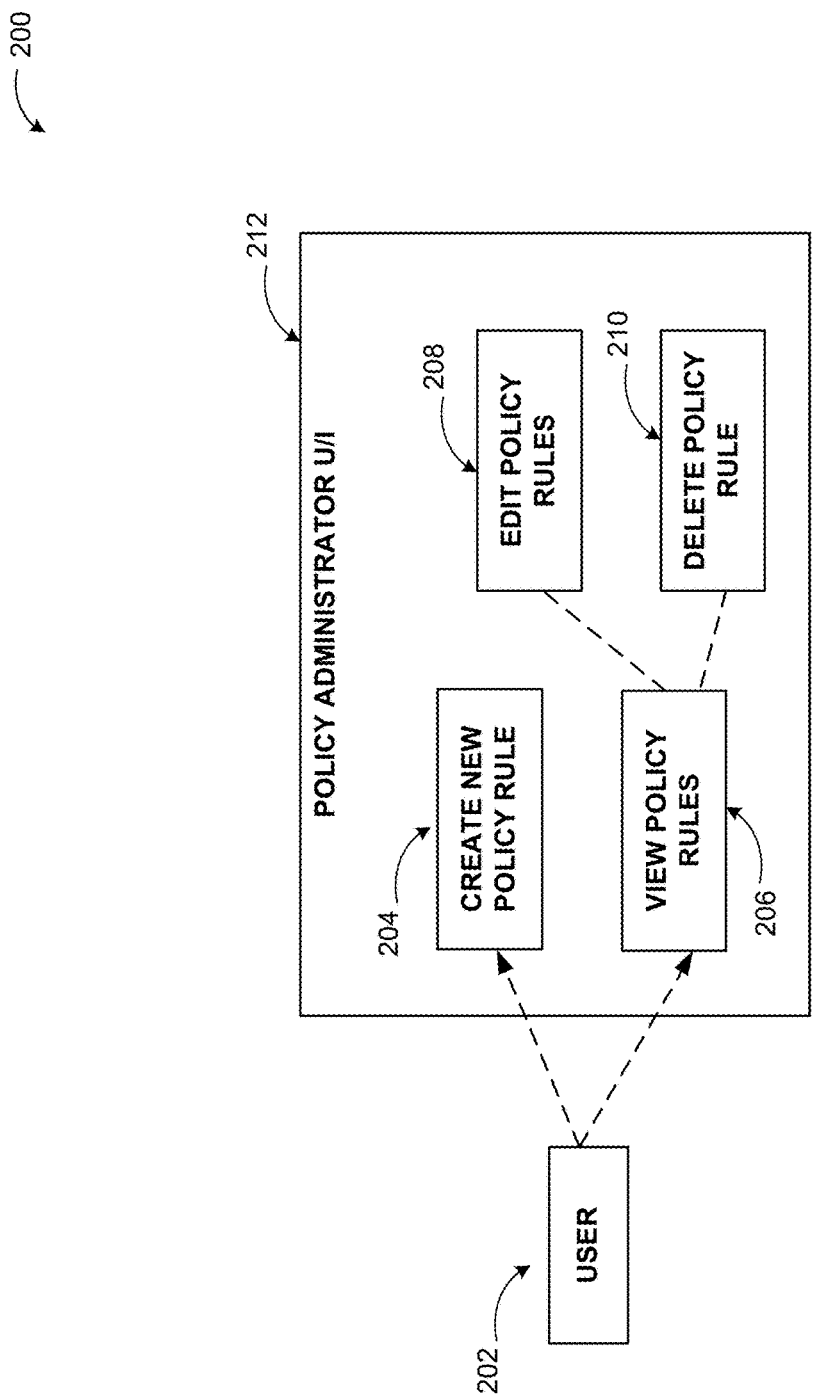
FIG. 2 illustrates an example scenario for creating and customizing a policy rule, according to embodiments.

FIG. 2 illustrates in diagram 200 an example scenario for creating and customizing a policy rule, according to embodiments. A system according to embodiments may enable an organization or a user 202 within an organization to create new policy rules for the organization utilizing a policy administrator user interface 212. New policy rules may be created for the organization as a whole, and new policy rules may be created and further customized for one or more sub-entities within the larger organization.

For example, user 202 may create the new policy rule 204 for the organization generally permitting invoices submitted to the organizations in amounts greater than $1,000, but a sub-entity of the organization may not permit invoices greater than $1,000. The user 202 may create the new policy rule 204 specific to the sub-entity customized to specify that invoices submitted to the sub-entity have to be less than $1,000. When the PVP 112 is applied to a business form affiliated with the sub-entity, the PVP 112 may apply the policy rule specifically created for the sub-entity and may identify a policy violation if an invoice submitted for the sub-entity shows an invoice amount greater than $1,000. The new policy rule 204 may be customized when it is initially created, or an existing policy rule may be further customized utilizing the policy administrator user interface 212.

In another example embodiment, the system may enable the user 202 to view existing policy rules 206 for the organization and to customize and/or edit 208 the existing policy rules using straightforward menu and selection options from the policy administrator user interface 212. The system may also enable the user 202 to view existing policy rules 206 and to delete 210 an existing policy rule if the user 202 determines the rule to be irrelevant or inapplicable to the organization.

A system according to embodiments may enable several customization options for customizing policy rules. Some customizable options may include for example, customizing policy rules according to affiliated clients or vendor of the organization, the location of an affiliated client, and the date of the relevant business form. For example, the organization may do regular business with Vendor A, and a policy rule may be created stating that invoice amounts from Vendor A in amounts greater than $1,000 are permitted. The organization may also occasionally do business with Vendor B, and a policy rule may be created stating that invoice amounts from Vendor B in amounts greater than $1,000 may not be permitted, or may be associated with special approval, for example. The PVP 112 may evaluate a submitted invoice against the custom policy rule for Vendor B, and may identify a policy violation if an invoice is submitted for Vendor B in an amount greater than $1,000.

As another example, a policy rule may be created for the organization requiring special approval for business forms from particular countries. In another scenario, a policy rule may be created allowing invoice amounts over a threshold amount for certain dates. For example, the policy rule may permit certain invoice amounts during January through November, and may specify a different amount for the month of December, or for another specified date. The PVP 112 may evaluate a submitted invoice against the custom policy rules, and may identify a violation if an invoice is submitted in December above the defined threshold amount.

In a further embodiment, the system may enable the user 202 to customize how policy violations are reported and processed, and what information is viewable on a policy violation report or results list. For example, the user may utilize the policy administrator user interface 212 to define what violation messages are displayed for each policy violation and the type of information that may be included in the violation message or results list, such as specifically what policy rules were violated, where the violations may be located and when they were violated. Additionally, the user 202 may also customize specific policy rule exceptions and may customize how violations are processed. For example, the user 202 may specify that certain types of violations may be routed to the user 202 for special approval when identified by the PVP.

As an example scenario, the user 202 may customize the policy validation rule using the policy administrator user interface 212. The user 202 may select a "create policy" option for a particular business form that the organization uses, such as business invoices. The policy administrator user interface 212 may open for the invoice policy form and the user 202 may select to create a new policy rule for a selected invoice. Additional selections may be presented to the user for customization, such as selecting the applicable sub-entities, affiliated clients, and/or location. The user 202 may create a new policy rule specifying a condition for which the policy validation process may evaluate further invoice forms meeting the selected criteria. For example, the user may create the condition where a violation occurs if "Invoice.Invoice amount>1000.00" and the invoice line is not related to a purchase order. The created policy rule may be saved in the policy rule database in the policy administrator and may be used for future invoice evaluations by the PVP. When an invoice is evaluated using the PVP, if a line of the invoice violates the created policy rule, a message may be returned indicating that the "Invoice's line is over 1000.00." The user 202 can then use this information to approve the invoice anyway, or otherwise fix the problem using the organization's resources.

Figure 3:
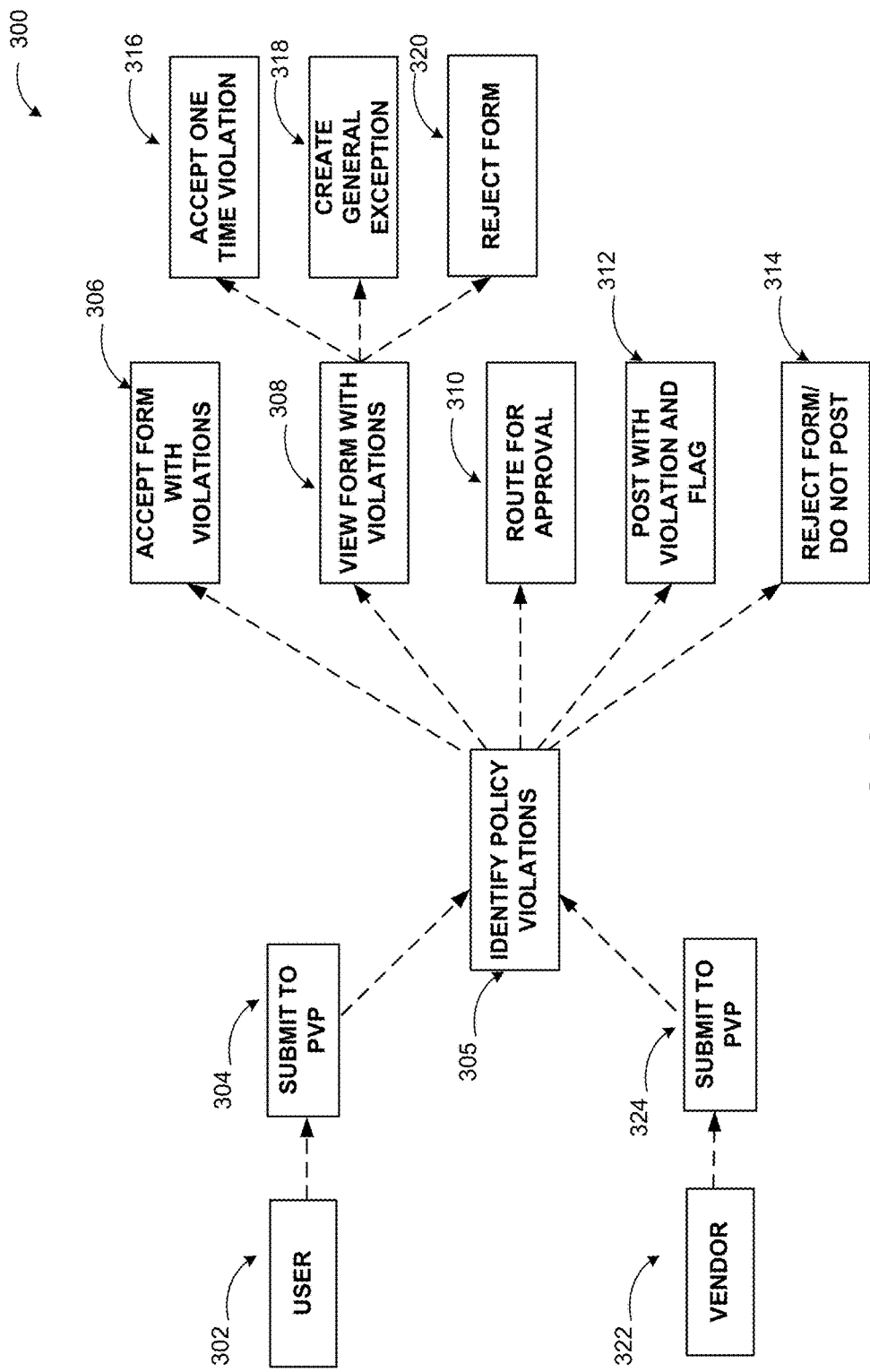
FIG. 3 illustrates an example scenario of a policy validation process, according to embodiments.

FIG. 3 illustrates in diagram 300 an example scenario of a policy validation process, according to embodiments. As described in conjunction with FIG. 1, the system may be configured to apply the PVP at any time during the organization's business workflow. For example, the system may be configured to automatically apply the PVP upon the submission 304 of the business form to the organization to validate the business form against the policy rules before the business form is posted to the organization's system. The PVP may also be applied at any time when a user 302 within the organization desires to evaluate a business form and submits the business form to the PVP 302. Further, the system may be configured to apply the PVP when an external affiliate or vendor 322 submits the business form to the PVP via a vendor portal 324 coordinated with the organization's enterprise framework.

In a system according to embodiments, upon submission of the business form via any of the submission methods, the PVP may be applied to evaluate the business form against the defined policy rules within the policy database of the organization's policy administrator. The PVP may evaluate the business form against the defined policy rules in order to validate the business form against the appropriate policy rules stored in the policy database to identify one or more policy violations 305 within the business form. The PVP may apply the most appropriate policy rules within the database according to the vendor 322 which submitted the business form, or according to the selected criteria specified by the user 302 when the business form was submitted.

In an example embodiment, the system may enable the organization to control how policy violations are processed, such that a number of different options may be available for presenting and addressing policy violations. If the PVP identifies that the submitted business form violates one or more policy rules, the PVP may indicate the existence of a violation. The violation may be reported in a displayed message which may indicate the type of violation and the location of the violation. Alternatively, the PVP may generate a policy violation results list, listing the policy violations identified in the business form with further information about the type and location of violation, so that the organization may review the list of policy violations to fix the identified problems. The violation results list may be stored in the policy database so that subsequent revalidation checks by the user can be performed and evaluated against the prior violation results. Additionally, the system may be configured to enable subsequent revalidation checks to be performed by applying the PVP to evaluate a selected relevant policy rule. For example, if a submitted invoice has an identified policy violation where the vendor charges too much shipping, but the rest of the invoice is approved, then the user can select to re-apply the PVP to the invoice only applying the relevant rule rather than re-applying the PVP for the policy rules.

In a system according to embodiments, once the policy violations have been identified and presented to the user 302 and/or organization, the system may enable several options for processing the policy violations. In an example scenario, the system may be configured to prevent the posting of the business form to the organization, until the violation has been addressed, or until a user within the organization has approved the violation. For example, the user 302 may accept the business form with the violation(s) 306, and the invoice may be admitted into the organization's system. The user 302 may also select to view the business form with the violation(s) 308 and the user may review the identified violations and decide the most appropriate action. For example, the user 302 may accept the business form with the violation as a onetime exception 316 to the violated policy rule. The onetime exception may be updated in the policy database such that when the PVP is subsequently applied to the same business form, the previous policy violation may be accepted and not identified as a policy violation. Alternatively, the user 302 may create a general exception 318 to the policy rule. The newly created general exception may be updated in the policy database such that when the PVP is applied to similar business forms, the previous policy violation may be accepted and not identified as a policy violation. The user 302 may also reject 320 the business form and prevent the business form from being accepted into the organization.

In another example embodiment, the system may be configured to route 310 the business form to a specified user within the organization for special approval when one or more policy violations are identified. If the user 302 approves the violation, the business form may be posted to the organization with the policy violation. The special approval may be saved as a general exception to future business forms meeting the same criteria as the current business form, or alternatively, the special approval may be a onetime exception, such that in each further PVP, a similar policy violation in a subsequently submitted business document may be identified as a policy violation and the PVP may route 310 the business document to a user for special approval. For example, if the user approves a policy violation as a general exception, then the policy rule may be updated in the policy database such that if a second PVP is applied to the same business form, the policy rule is not determined to be violated, and may not be associated with a second approval by the user.

In a further embodiment, the PVP may be configured to prevent the business form from being posted if and when policy violations are identified, and the PVP may automatically reject the business form 314. In an alternative embodiment, the PVP may be configured to allow the business form to be posted to the organization, but the business form may be posted and flagged 312 to indicate that the business form has been posted with a policy violation. The PVP may display a message to provide further information to the user about what the policy violation is and where the policy violation occurs.

The example systems in FIG. 1 through 3 have been described with specific configurations, applications, and interactions. Embodiments are not limited to systems according to these examples. A system for integrating custom policy rules with a policy validation process for evaluating forms may be implemented in configurations employing fewer or additional components and performing other tasks. Furthermore, specific protocols and/or interfaces may be implemented in a similar manner using the principles described herein.

Figure 4:
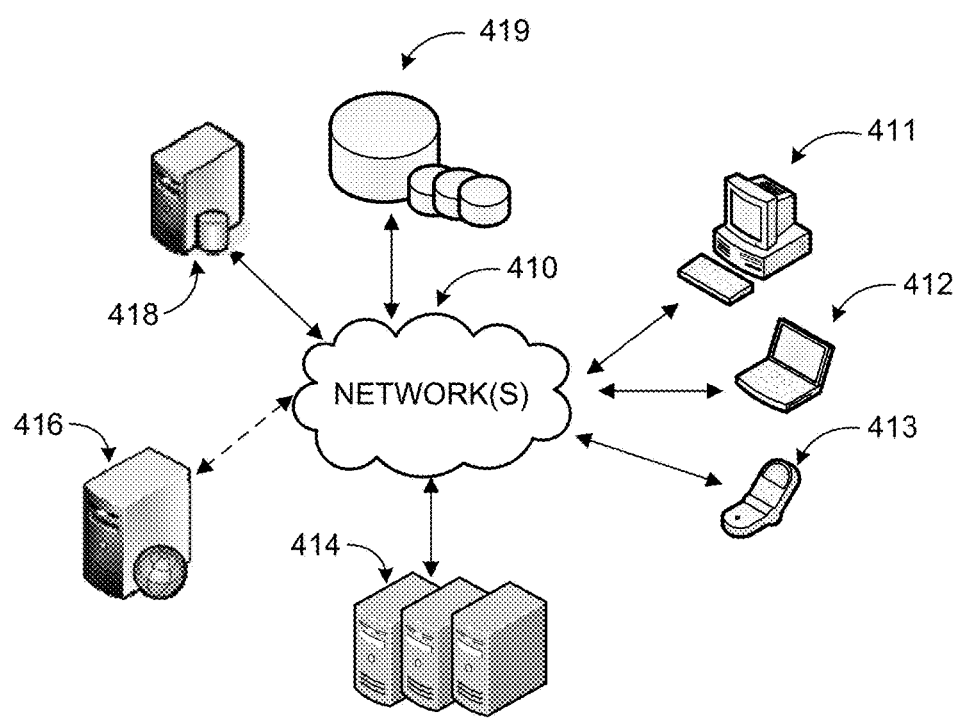
FIG. 4 is a networked environment, where a system according to embodiments may be implemented.

FIG. 4 is an example networked environment, where embodiments may be implemented. A system for integrating custom policy rules with a policy validation process for evaluating forms may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate access to business applications executed by servers 414, or on individual server 416. A business application executed on one of the servers may facilitate generating custom policy rules for an organization and integrating the policy rules with a policy validation process for validating forms. The business application may enable the organization to create new policy rules and to customize policy rules for business forms according to criteria such as affiliated entity, sub-entity, language, currency, location and date. The custom policy rules may be stored in policy database such that the policy validation process may validate submitted forms against the custom policy rules stored in the policy database in order to identify policy rule violations. The system may automatically apply the policy validation process upon the submission of a business form to the organization and may also enable a user to apply the policy validation process to a business form at any time when the user desires to evaluate the business form for violations. The application may provide a display message for indicating when policy violations have been identified in an evaluated form and may present options to the user for addressing the policy violation and approving the form. The application may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform integrating custom policy rules with a policy validation process for evaluating forms. Furthermore, the networked environments discussed in FIG. 4 are for illustration purposes only. Embodiments are not limited to the example applications, modules, or processes.

Figure 5:
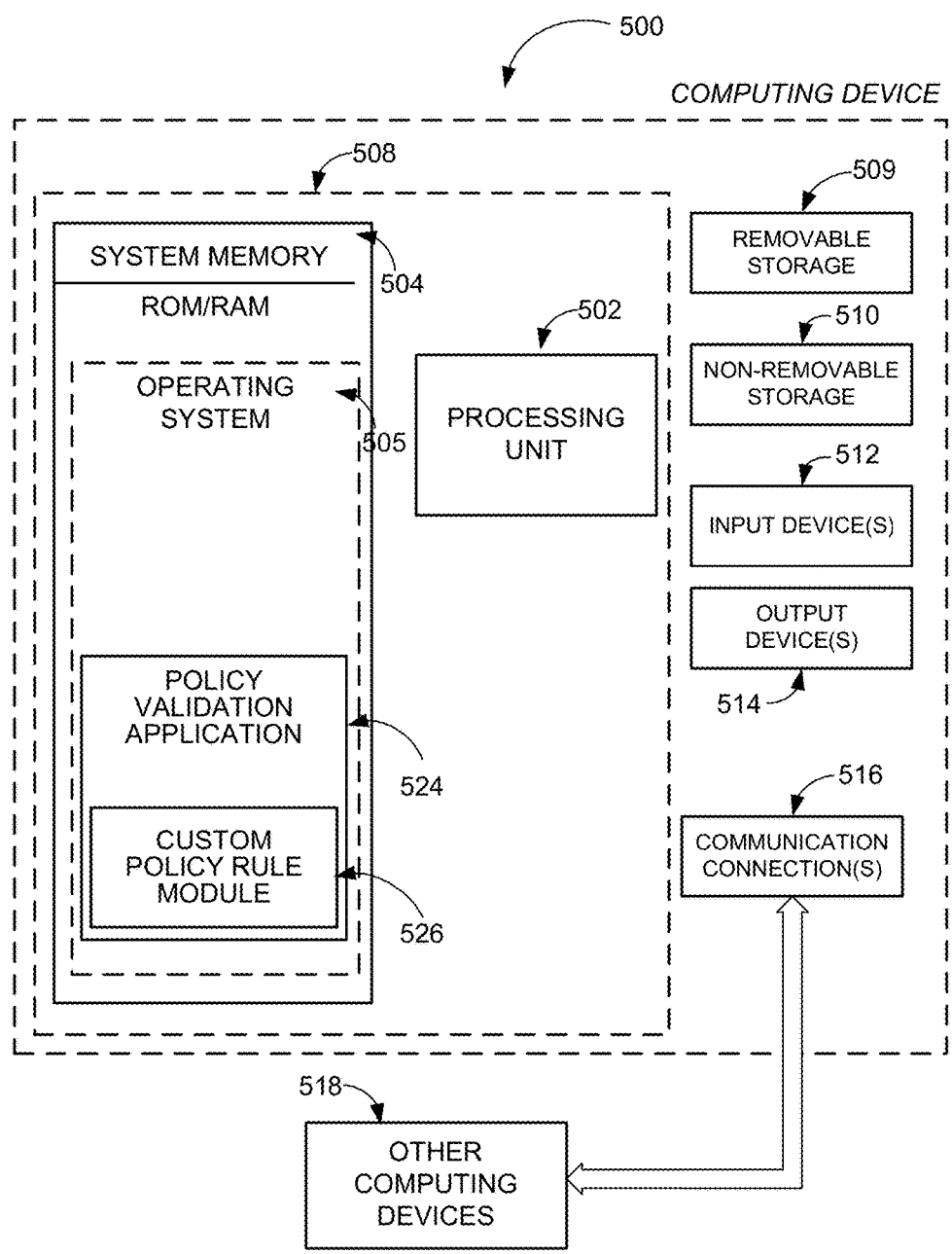
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing an application for executing a business application according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as a policy validation application 524 and a custom policy rule module 526.

The policy validation application 524 may facilitate generating custom policy rules for an organization and integrating the policy rules with a policy validation process for validating forms. The custom policy rule module 526 may enable the organization to create new policy rules and to customize policy rules for business forms utilizing a user interface provided by a policy administrator, without requiring any coding or programming, according criteria such as affiliated entity, sub-entity, language, currency, location and date. The custom policy rules may be stored in policy database such that the policy validation process may validate submitted forms against the custom policy rules stored in the policy database in order to identify policy rule violations. The policy validation application 524 may automatically apply the policy validation process upon the submission of a business form to the organization and may also enable a user to apply the policy validation process to a business form at any time when the user desires to evaluate the business form for violations. The policy validation application 524 may display a message indicating when policy violations have been identified in an evaluated form, and may generate a policy violations results list for storing in the policy database. Additionally, the policy validation application 524 may present options to the user for addressing the policy violation and approving the form into the organization's system. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
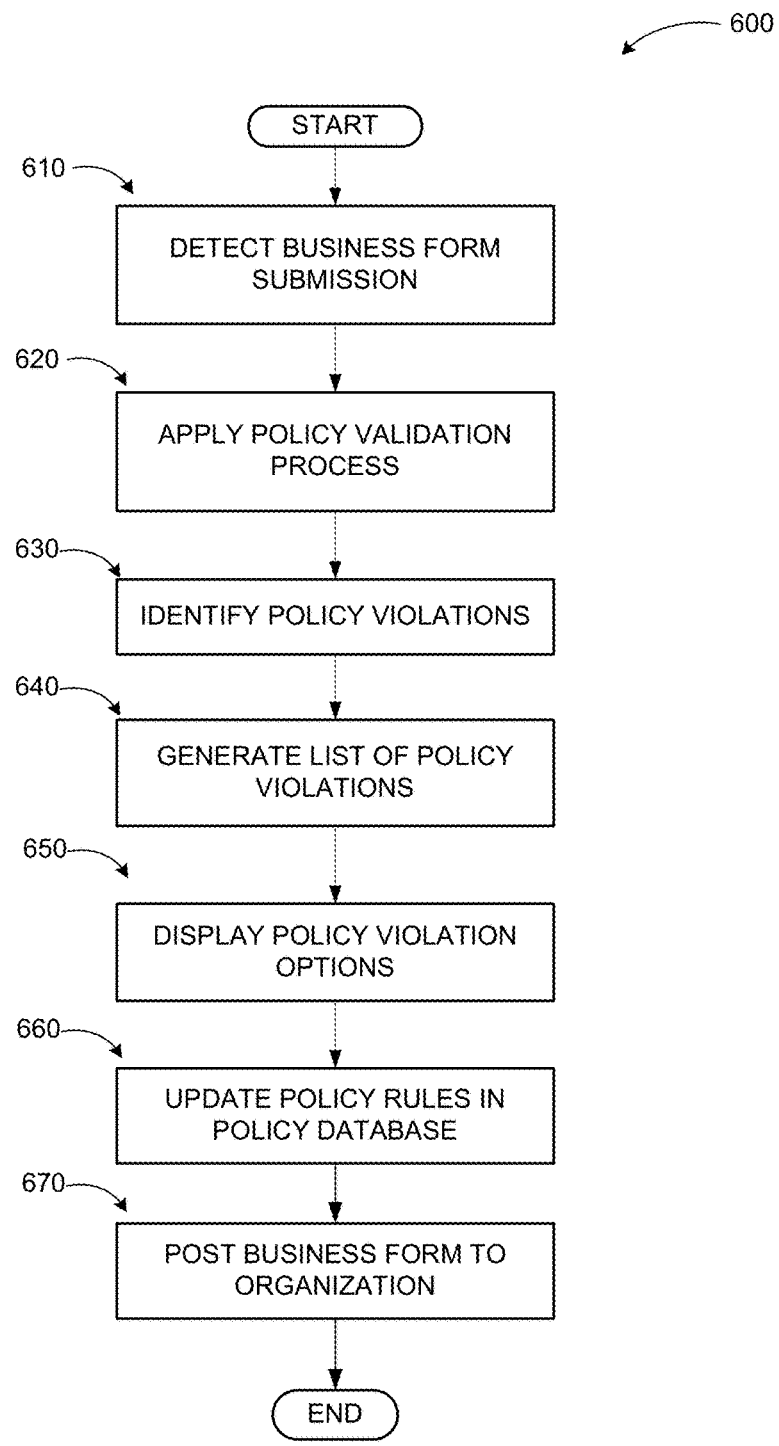
FIG. 6 illustrates a logic flow diagram for process 600 of integrating custom policy rules with a policy validation process for evaluating forms according to embodiments.

FIG. 6 illustrates a logic flow diagram for process 600 of integrating custom policy rules with a policy validation process for evaluating forms according to embodiments. Process 600 may be implemented on a computing device or similar electronic device capable of executing instructions through a processor.

Process 600 begins with operation 610, where the system may detect the submission of a business form. A business form may be submitted to the organization by a user within the organization, and additionally, a business form may be submitted to the organization by an external affiliate or vendor via a vendor portal coordinated with the organization's framework. Upon detection of a submission of the business form to the organization, the system may apply a policy validation process at operation 620. The policy validation process may be automatically applied upon submission to the organization by an organization's user or the external affiliate or vendor, before the business form may be posted into the organization's system, ensuring that a business form meets the organization's policy rules before it can be accepted into the organization's system. Additionally, at operation 620, a user within the organization may apply the policy validation process at any time to any business form within the organization when the user desires to validate the business form.

At operation 630 the policy validation process may evaluate the business form to validate the business form against the appropriate policy rules stored in the organization's policy database before the business form is posted to the organization's system, and may identify if one or more policy violations occur within the business form. At operation 640 the policy validation process may generate a policy violation results list, listing the policy violations identified in the business form with further information about the type and location of violation, so that the organization may review the list of policy violations to fix the identified problems. The violation results list may be stored in the policy database so that subsequent revalidation checks by the user may be performed and evaluated against the prior violation results.

At operation 650 the policy validation process may display a message indicating that one or more policy violations have occurred within the business form. The display message may be configured to provide information as to what the policy violation is and where the policy violation occurs, and may present options to the user for addressing the policy violations. In an example embodiment, the user may accept the business form with the violation(s), and the invoice may be admitted into the organization's system, or alternatively, the user may select to view the business form with the violation(s) and the user may review the identified violations and decide the most appropriate action for addressing the violation. The user may create a onetime exception or a general exception to the violated policy rule.

At operation 660, when a policy violation is approved and when exceptions created to the policy rule(s) are created by the user, the policy rules may be updated in the policy database such that when the policy validation process is subsequently applied to similar business forms, the business forms may be validated against the updated policy rules. At operation 670 if no policy violations are identified or when the user has addressed the identified policy violations and approved the business form with the violations, then the business form may be posted to the organization's system. In an embodiment, the policy validation process may be configured to allow the business form with identified and unaddressed policy violations to be posted to the organization with a flag to indicate that the business form has been posted with a policy violation.

The operations included in process 600 are for illustration purposes. Integrating custom policy rules with a policy validation process for evaluating forms may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for integrating custom policy rules with a policy validation process, the method comprising:
    at a processor:
        providing to be displayed a user interface;
        receiving a policy rule defined through the user interface, wherein the policy rule is configured to enable the processor to validate a form used by an organization;
        storing the policy rule in a policy database;
        detecting a submission of the form to the processor;
        evaluating the form against the policy rule stored in the policy database;
        identifying a policy violation in the form;
        generating a policy violation results list based on the identified policy violation;
        determining that the form is accepted with the policy violation as a general exception to violated policy rules;
        updating the policy database;
        evaluating the form and other forms, wherein the form and the other forms share a sub-entity of the organization; and
        determining that the form and the other forms with the policy violation are accepted automatically based on the updating.

2. The method of claim 1, further comprising:
    storing a customized policy rule for the sub-entity of the organization in the policy database.

3. The method of claim 2, further comprising:
    enabling customization of the policy rule according to one of: an affiliated vendor of the organization, a location of the affiliated vendor, and a date of the form submission.

4. The method of claim 1, further comprising:
storing the policy violation results list in the policy database provided by the policy administrator.

5. The method of claim 1, further comprising:
enabling customization of a reporting format of the policy violation results list.

6. The method of claim 1, further comprising:
enabling creation of a plurality of policy rules categorized by at least one of a date and the sub-entity of the organization.

7. The method of claim 1, further comprising:
providing to be displayed a violation message indicating that the policy violation has been identified in the form.

8. The method of claim 7, wherein the message identifies at least one of a nature of the policy violation and an item associated with the policy violation.

9. The method of claim 1, further comprising:
enabling selection among displayed options for processing the form with the policy violation.

10. The method of claim 1, further comprising:
preventing the form from being posted to a workflow system of the organization if one or more policy violations are identified by the policy validation process.

11. The method of claim 1, further comprising:
enabling reapplication of the policy validation process to the form to evaluate the form against a selected policy rule stored in the policy database.

12. A server for integrating custom policy rules with a policy validation process, comprising:
a memory storing instructions;
a processor coupled to the memory, wherein the processor is configured to:
provide to be displayed a user interface;
receive a policy rule defined through the user interface, wherein the policy rule is configured to enable the processor to validate a form used by an organization;
enable customization of the policy rule for one or more sub-entities of the organization;
store the policy rule in a policy database provided by a policy administrator within the organization;
detect a submission of the form to the processor;
evaluate the form against the policy rule stored in the policy database;
identify a policy violation in the form;
generate a policy violation results list based on the identified policy violation in the form and store the policy violation results list in the policy database;
provide to be displayed a violation message indicating the identified policy violation in the form such that the form is enabled to be addressed, accepted, and/or rejected;
determine that the form is accepted with the policy violation as a general exception to violated policy rule;
update the policy database;
evaluate the form and other forms, wherein the form and the other forms share a sub-entity of the organization; and
determine that the form and the other forms with the policy violation are accepted automatically based on the updating.

13. The server of claim 12, wherein the processor is further configured to:
automatically apply the policy validation process upon an initial submission of the form to the organization by one of a user within the organization and an external entity via an external entity portal; and
automatically re-apply the policy validation process to the form to evaluate the form against a user selected policy rule stored in the policy database.

14. The server of claim 12, wherein the processor is further configured to:
post the form with the policy violation to a workflow system of the organization and flag the posted form to indicate presence of the policy violation.

15. The server of claim 14, wherein the processor is further configured to:
route the form with the policy violation to a specified user for special approval before posting the form to the workflow system of the organization.

16. The server of claim 12, wherein the processor is further configured to:
enable a user of the organization to one of view, customize, and delete a policy rule in the policy database.

17. The server of claim 12, wherein the processor is further configured to:
enable a user of the organization to select among displayed options for processing the form with the policy violation, wherein the displayed options include one or more of:
prevent the form from being posted to the workflow system of the organization if the policy violation is identified by the policy validation process;
post the form with the policy violation to the workflow system of the organization and flag the posted form to indicate presence of the policy violation; and
route the form with the policy violation to a specified user for special approval before posting the submitted form to the workflow system of the organization.

18. A computer-readable memory device with instructions stored thereon for integrating custom policy rules with a policy validation process, the instructions comprising:
providing to be displayed a user interface;
receiving a policy rule defined through the user interface, wherein the policy rule is configured to enable validation of a form used by an organization;
enabling customization of the policy rule for one or more sub-entities of the organization;
storing the policy rule in a policy database provided by a policy administrator within the organization;
detecting a submission of the form to the processor;
evaluating the form against the policy rule stored in the policy database;
identifying a policy violation in the form;
generating a policy violation results list based on the identified policy violation and storing the policy violation results list in the policy database;
providing to be displayed a violation message indicating the identified policy violation in the form;
enabling customization of reporting and processing of the policy violation and information viewable on the policy violation results list;
determining that the form is accepted with the policy violation as a general exception to violated policy rules;
updating the policy database;
evaluating the form and other forms, wherein the form and the other forms share a sub-entity of the organization; and
determining that the form and the other forms with the policy violation are accepted automatically based on the updating.

19. The computer-readable memory device of claim 18, wherein the instructions further comprise:
    integrating a user based policy rule creation process, a query-building capability of the policy rule, and a workflow system of the organization as a complete end-user custom solution.

\* \* \* \* \*